US009465805B1

(12) United States Patent
Bilsborough (10) Patent No.: US 9,465,805 B1
(45) Date of Patent: *Oct. 11, 2016

(54) SYSTEMS AND METHODS FOR ARCHIVING RELATED ITEMS

(71) Applicant: Veritas Technologies LLC, Mountain View, CA (US)

(72) Inventor: Michael Bilsborough, Berkshire (GB)

(73) Assignee: Veritas Technologies LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,028

(22) Filed: Jan. 20, 2015

Related U.S. Application Data (63) Continuation of application No. 12/550,709, filed on Aug. 31, 2009, now Pat. No. 8,972,355.

(51) Int. Cl.
*G06F 17/30* (2006.01)
*H04L 29/08* (2006.01)

(52) U.S. Cl.
CPC ......... *G06F 17/30073* (2013.01); *H04L 67/10* (2013.01)

(58) Field of Classification Search
USPC ................................................ 707/661, 667
See application file for complete search history.

(56) References Cited

U.S. PATENT DOCUMENTS

| | | | | |
|---|---|---|---|---|
| 6,745,197 B2* | 6/2004 | McDonald | ........... | G06Q 10/107 |
| 7,761,429 B2* | 7/2010 | Polimeni | ............. | G06Q 10/107 |
| | | | | 707/668 |
| 8,032,493 B2* | 10/2011 | Gong | ................ | G06F 17/30306 |
| | | | | 707/661 |
| 8,058,892 B2* | 11/2011 | Satou | ..................... | G01R 1/045 |
| | | | | 324/500 |
| 8,171,087 B2* | 5/2012 | Carrer | ................... | G06Q 10/00 |
| | | | | 709/205 |
| 8,458,263 B1* | 6/2013 | Ruben | ................... | H04L 12/586 |
| | | | | 707/661 |
| 8,701,046 B2* | 4/2014 | McCann | ........... | G06F 17/30528 |
| | | | | 709/206 |
| 9,235,641 B1* | 1/2016 | Kumar | ............. | G06F 17/30864 |
| 2004/0133645 A1* | 7/2004 | Massanelli | ......... | G06F 17/2205 |
| | | | | 709/206 |
| 2004/0221295 A1* | 11/2004 | Kawai | .................. | G06Q 10/107 |
| | | | | 719/313 |
| 2006/0224846 A1 | 10/2006 | Amarendran et al. | | |
| 2007/0038710 A1* | 2/2007 | Li | ........................ | G06Q 10/107 |
| | | | | 709/206 |
| 2008/0172462 A1* | 7/2008 | Carrer | .................... | G06Q 10/00 |
| | | | | 709/204 |
| 2008/0250084 A1 | 10/2008 | Polimeni | | |
| 2009/0198729 A1 | 8/2009 | Gong | | |
| 2014/0208227 A1* | 7/2014 | McCann | ........... | G06F 17/30528 |
| | | | | 715/752 |

OTHER PUBLICATIONS

Phelan, Thomas, "Google Email—Reading Email", https://webapps.peddie.org/KB/KnowledgebaseArticle10090.aspx, as accessed on Jul. 2, 2009, (Jun. 2, 2008).

* cited by examiner

*Primary Examiner* — Debbie Le
(74) *Attorney, Agent, or Firm* — ALG Intellectual Property, LLC (57) ABSTRACT

A computer-implemented method for archiving related items may include: 1) identifying a data element on a computing device, 2) identifying at least one additional data element on the computing device that is related to the data element, the data element and the additional related data element collectively representing a group of related data elements, 3) determining, by applying an archiving policy to the group of related data elements, that the entire group of related data elements is eligible for archiving, and then 4) archiving the group of related data elements. Corresponding systems and computer-readable media are also disclosed.

19 Claims, 7 Drawing Sheets

SYSTEMS AND METHODS FOR ARCHIVING RELATED ITEMS

CROSS REFERENCE TO RELATED APPLICATION

This application is a continuation of U.S. application Ser. No. 12/550,709, filed 31 Aug. 2009, the disclosure of which is incorporated, in its entirety, by this reference.

BACKGROUND

Archiving systems (such as email-archiving systems) typically copy data elements (such as emails) from a source system to an archived system in order to conserve storage resources on the source system. For example, an email-archiving system may archive emails on a computing system that are more than one year old in order to free up the storage space occupied by these emails on the computing system.

Unfortunately, conventional archiving systems typically archive data elements without regard for their potential relationship to other data elements. For example, an email-archiving system may archive a first email in a conversation thread (if, for example, this email is more than one year old) without archiving a second or third email in the same conversation thread (if, for example, these subsequent emails are less than one year old). In this example, this may result in archiving and removing emails from an active email-conversation thread, potentially leading to user frustration.

Moreover, because conventional archiving systems typically provide a discrete link or shortcut to each archived data element, the number of links or references placed on a computing system for a single email-conversation thread may continually increase as additional emails are added to the conversation thread and later archived. As such, the instant disclosure identifies a need for systems and methods for improved archiving of related items.

SUMMARY

The instant disclosure generally relates to systems and methods for archiving related items. In one example, and as will be described in greater detail below, one or more of the exemplary systems described herein may accomplish this task by: 1) receiving a request to archive a data element (such as an email) on a computing device (from, e.g., a user or administrator of the computing device), 2) identifying at least one additional data element on the computing device that is related to the data element (e.g., additional emails from the same conversation thread as the first email), 3) determining, by applying an archiving policy to this group of related data elements, that the entire group of related data elements is eligible for archiving, and then 4) archiving the entire group of related data elements.

In one example, each of the related data elements may share at least one property (such as file name, file size, file-creation/modification date, file type, or the like) in common. For example, the systems described herein may determine that a group of emails are related if these emails are part of the same email-conversation thread (as indicated by, for example, each email's subject line, sender/recipient list, or the like).

In some examples, the systems described herein may, upon archiving the group of related data elements, remove these data elements from the computing device. The systems described herein may then create a single reference on the computing device that points to the archived group of related data elements. In some examples, this reference may include an amalgamation of the properties of the group of data elements (such as, e.g., an identification of each unique sender/recipient within an email-conversation thread). In at least one example, the systems described herein may also assign a unique identifier to this archived group of related data elements.

By identifying and determining whether each data element within a group of related data elements is eligible for archiving prior to archiving any of the data elements, the systems and methods described herein may prevent archiving systems from archiving one data element within a group of related data elements without archiving the other related data elements. This may prevent, for example, an archiving system from archiving only a portion of emails in a conversation thread. Moreover, by creating and providing a single reference or shortcut to an entire group of archived/related data elements, as opposed to creating a separate reference or shortcut for each archived data element, the systems and methods described herein may conserve storage space and improve storage management on endpoint devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for archiving related items. The following will provide, with reference to FIGS. 1-2, detailed descriptions of exemplary systems for performing this task. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

Figure 1:
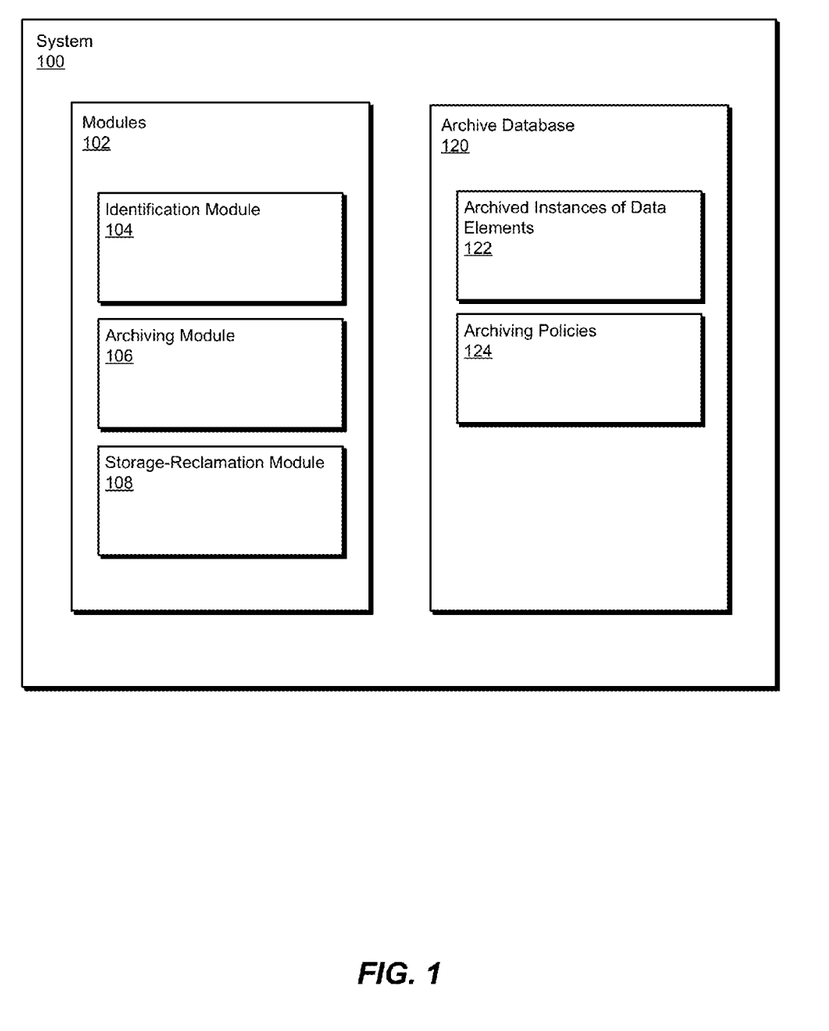
FIG. 1 is a block diagram of an exemplary system for archiving related items.

FIG. 1 is a block diagram of an exemplary system 100 for archiving related items. As illustrated in this figure, exemplary system 100 may include one or more modules 102 for performing one or more tasks. For example, and as will be explained in greater detail below, exemplary system 100 may include an identification module 104 programmed to identify, upon receiving a request to archive a data element, additional data elements that are related to the data element. Exemplary system 100 may also include an archiving module 106 programmed to archive groups of related data elements.

In addition, and as will be described in greater detail below, exemplary system 100 may include a storage-reclamation module 108 programmed to remove archived groups of data elements from computing devices in order to reclaim storage space. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystem 202 and/or archiving system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases. For example, system 100 may include an archive database 120 for storing archived instances 122 of data elements, as will be discussed in greater detail below. In some examples, archive database 120 may also store one or more archiving policies 124, as detailed below.

Database 120 may represent portions of a single database or computing device or a plurality of databases or computing devices. For example, database 120 may represent a portion of archiving system 206 in FIG. 2, computing system 610 in FIG. 6, and/or portions of exemplary network architecture 700 in FIG. 7. Alternatively, database 120 may represent one or more physically separate devices capable of being accessed by a computing device, such as archiving system 206 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 2:
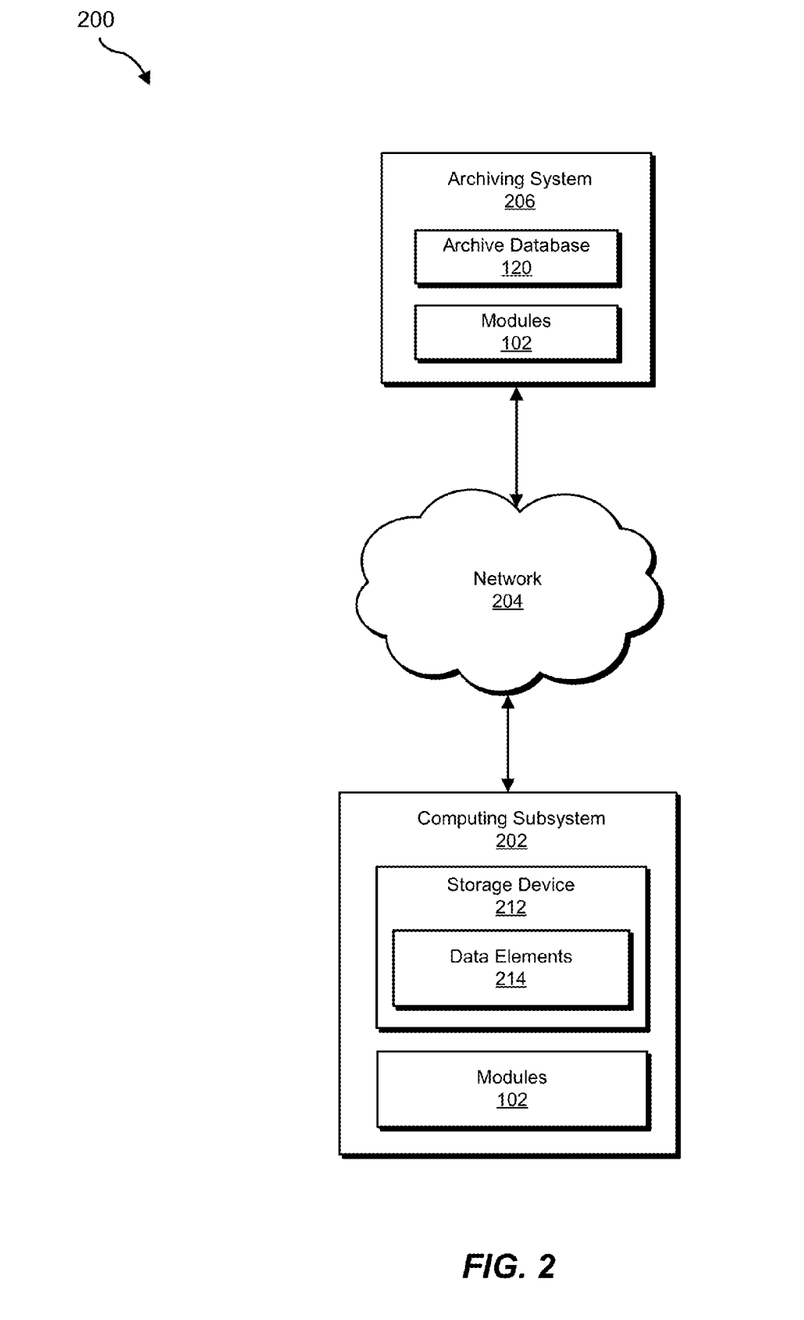
FIG. 2 is a block diagram of an exemplary system for archiving related items.

As shown in FIG. 2, system 200 may include a computing subsystem 202 in communication with an archiving system 206 via a network 204. In one embodiment, and as will be described in greater detail below, modules 102 may program archiving system 206 (and/or computing subsystem 202) to: 1) identify a data element (such as one of data elements 214) on computing subsystem 202, 2) identify at least one additional data element on the computing subsystem 202 that is related to the data element (in this example, the data element and the additional related data element may collectively represent a group of related data elements), 3) determine, by applying an archiving policy (such as one or more of archiving policies 124 in FIG. 1) to the group of related data elements, that the entire group of related data elements is eligible for archiving, and then 4) archive the group of related data elements.

Computing subsystem 202 generally represents any type or form of computing device capable of reading computer-executable instructions. Examples of computing subsystem 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Archiving system 206 generally represents any type or form of computing device that is capable of archiving data elements (e.g., data elements 214 on computing subsystem 202). Examples of archiving system 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing subsystem 202 and archiving system 206.

Figure 3:
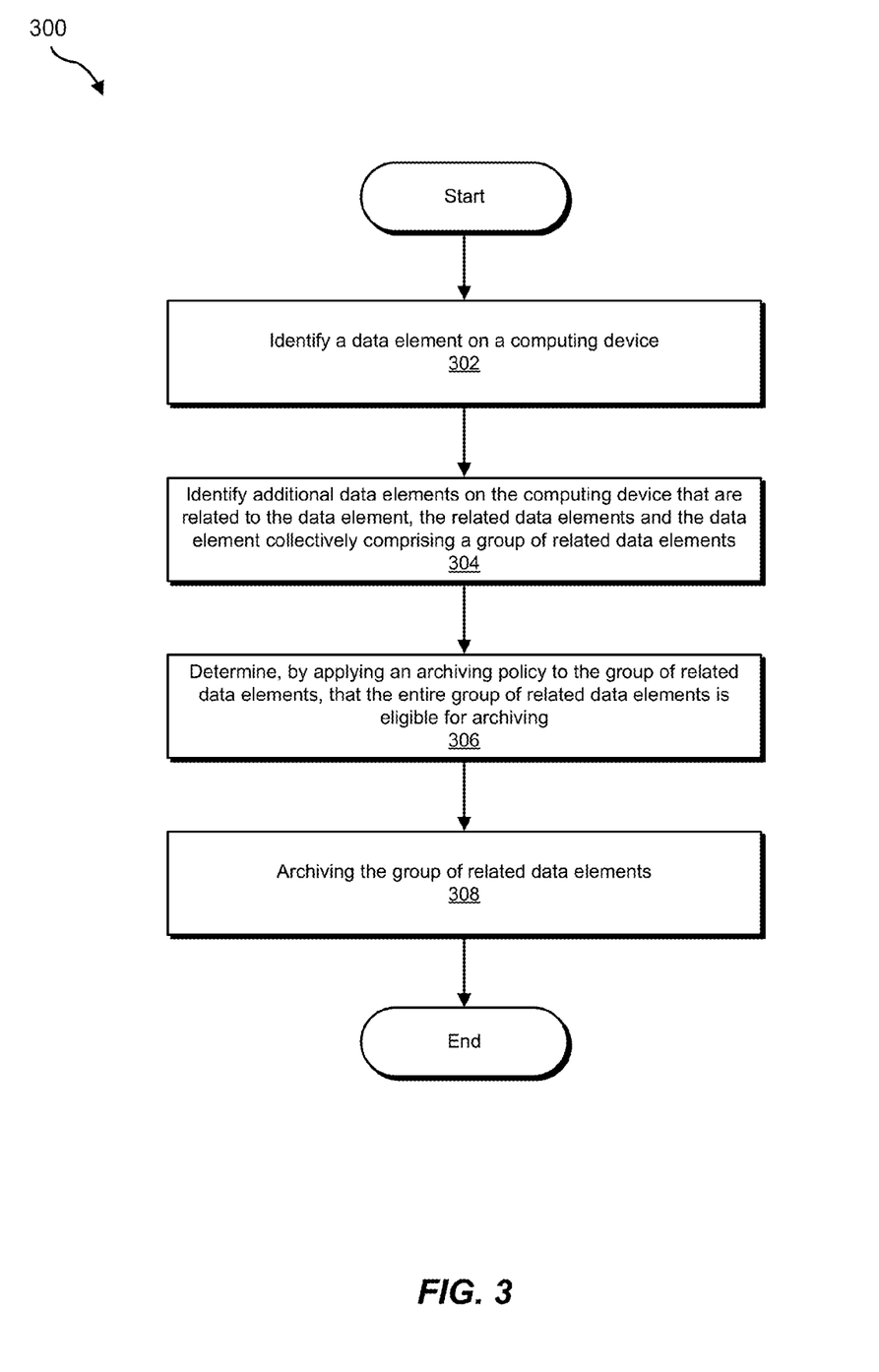
FIG. 3 is a flow diagram of an exemplary method for archiving related items.

FIG. 3 is a flow diagram of an exemplary computer-implemented method 300 for archiving related items. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the various systems described herein may identify a data element on a computing device. For example, identification module 104 in FIG. 1 (which may, as detailed above, represent a portion of archiving system 206 in FIG. 2) may identify a data element 214 on computing subsystem 202.

Identification module 104 may perform step 302 in a variety of ways. In one example, identification module 104 may identify a data element by receiving a request to archive the data element. For example, a user of computing subsystem 202 may request that archiving system 206 archive an email 404 in FIG. 4 by selecting and designating this email for archiving. Similarly, an administrator of computing subsystem 202 may instruct archiving system 206 to archive various data elements (such as emails generated prior to a specified cutoff date) on computing subsystem 202.

As detailed above, a data element may represent all or a portion of a file, all or a portion of an email, all or a portion of an email attachment, or any other type or form of data structure that may be archived and/or backed up. For example, the data element identified in step 302 may represent an email attachment 412 ("Presentation.ppt," having a file size of 11.1 MB) associated with email 404 in FIG. 4. Alternatively, the data element identified in step 302 may represent the entirety of email 404, including attachments 412 ("Presentation.ppt") and 414 ("Notes.pdf").

Returning to FIG. 3, at step 304 the systems described herein may identify at least one additional data element on the computing device that is related to the data element identified at step 302. For example, upon receiving a request to archive email 404 in FIG. 4, identification module 104 may determine that emails 402 and 406 are related to email 404. In some examples, these emails (i.e., emails 402-406) may collectively represent a group of related emails (i.e., data elements).

Identification module 104 may identify related data elements in a variety of ways. In one example, identification module 104 may perform step 304 by identifying at least one additional data element that shares at least one property in common with the data element identified in step 302. For example, identification module 104 may, upon receiving a request to archive email 404 in FIG. 4, scan a user's email mailbox for email messages that share at least one property in common with email 404.

Examples of properties that may be shared in common between data elements include, without limitation, file names, file sizes, file-creation dates, file-modification dates, file authors, file contents, file types, and/or any other file property. In the case of email messages, such properties may include, without limitation, email recipients, email senders, email subject lines, email contents, email file sizes, email attachments, email-attachment file sizes, email send dates, email received dates, and/or any other email property that may be used to identify relationships between email messages.

Figure 4:
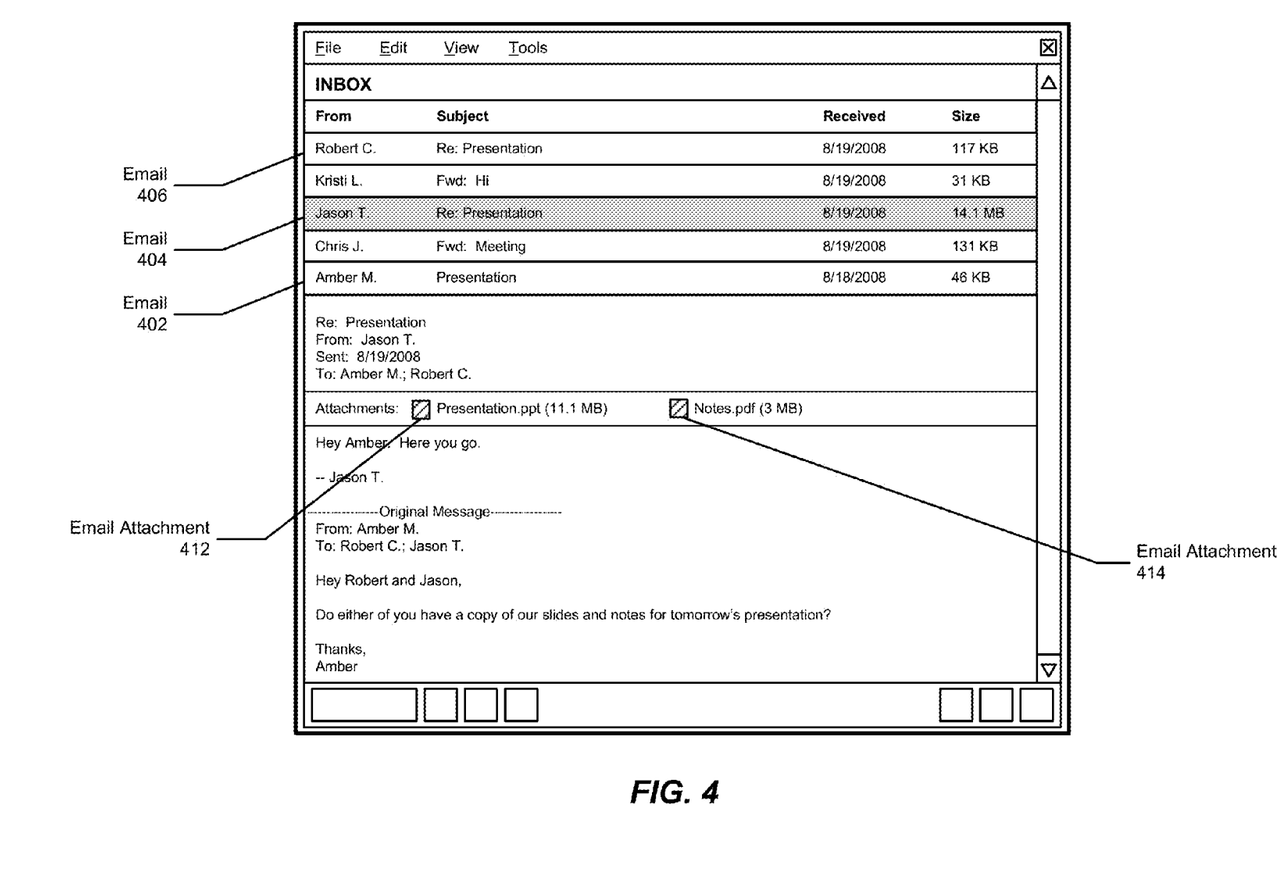
FIG. 4 is a block diagram of an exemplary user interface containing a plurality of related emails.

For example, in the example illustrated in FIG. 4, identification module 104 may determine that emails 402 and 406 are related to email 404 since, for example: 1) the subject line ("Presentation") of each of these emails is identical, 2) the same individuals (in this example, "Robert C.," "Amber M.," and "Jason T.") are involved in each of these emails, 3) email 406 represents a reply to email 404 and email 404 represents a reply to email 402, and/or 4) the content of the body of email 406 contains the content of the body of email 404 (since email 406 represents a reply to email 404) and the content of the body of email 404 contains the content of the body of email 402 (since email 404 represents a reply to email 402).

Returning to FIG. 3, at step 306 the systems described herein may determine, by applying an archiving policy to the group of related data elements identified in step 304, that the entire group of related data elements is eligible for archiving. For example, archiving module 106 in FIG. 1 (which may, as detailed above, represent a portion of archiving system 206 in FIG. 2) may determine, by applying one or more archiving policies 124 from FIG. 1 to emails 402-406, that each of these emails is eligible for archiving.

The term "archiving policy," as used herein, generally refers to one or more rules and/or criteria that may be used to determine whether to archive a data element. Examples of criteria that may be included within an archiving policy include criteria relating to, without limitation, file name (e.g., criteria that specify archiving files having specific file names), file size (e.g., criteria that specify archiving files that are less than, greater than, or equal to specific file sizes), file-creation date (e.g., criteria that specify archiving files created on, before, or after a specific date), file-modification date (e.g., criteria that specify archiving files modified on, before, or after a specific date), file author (e.g., criteria that specify archiving files created by specific users), file content (e.g., criteria that specify archiving files that contain specific content, such as words or phrases), file type (e.g., criteria that specify archiving files of a specific type, such as ".doc" files), and/or any other file property (such as email properties, as detailed above).

Archiving module 106 may perform step 306 in a variety of ways. In one example, archiving module 106 may determine whether each data element within a group of related data elements satisfies the various criteria of an archiving policy. For example, in the case of an email-archiving policy that specifies archiving emails that are older than one year, archiving module 106 may determine that each of emails 402-406 are eligible for archiving since each of these emails was sent/received more than one year ago.

Returning to FIG. 3, at step 308 the systems described herein may archive the entire group of related data elements identified in step 304. For example, archiving module 106 in FIG. 1 may archive emails 402-406 in FIG. 4.

Archiving module 106 may archive data elements in a variety of ways. In one example, archiving module 106 may archive a data element by creating an archived instance of the data element and then storing the same within archive database 120 of archiving system 206 in FIG. 2. For example, archiving module 106 may create an archived instance for each of emails 402-406 and then store the same within archive database 120 of archiving system 206. Upon completion of step 308, exemplary method 300 in FIG. 3 may terminate.

In one example, upon archiving the group of related data elements at step 308, the various systems described herein may remove this group of related data elements from the computing device. For example, storage-reclamation module 108 in FIG. 1 (which may, as detailed above, represent a portion of archiving system 206 and/or computing subsystem 202 in FIG. 2) may instruct computing subsystem 202 to delete emails 402-406 from storage device 212.

Figure 5:
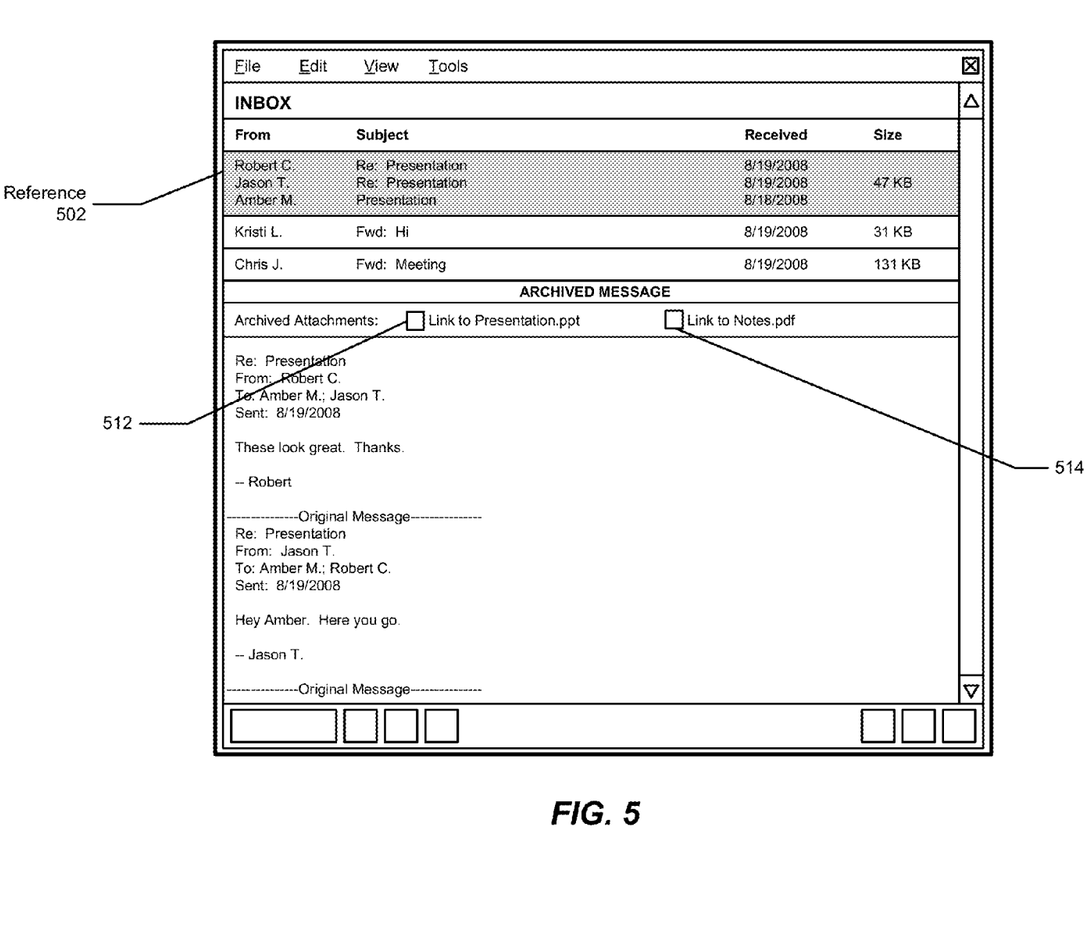
FIG. 5 is a block diagram of the exemplary user interface in FIG. 4 containing a reference to an archived group of related emails.

In some examples, upon removing these data elements, storage-reclamation module 108 may create a single reference, link, or shortcut on the computing device for the entire group of related data elements. For example, as illustrated in FIG. 5, upon instructing computing subsystem 202 to remove emails 402-406 in FIG. 4 from storage device 212, storage-reclamation module 108 may create a single reference 502 in FIG. 5 for this group of related email messages. In this example, reference 502 (which has a total file size of 47 KB, as opposed to the original emails, which collectively had a file size of over 14 MB) may be stored in place of emails 402-406 within the user's mailbox in FIG. 5.

In some examples, reference 502 in FIG. 5 may point to archived instances of emails 402-406 stored in archive database 120 of archiving system 206 in FIG. 2. Thus, when a user of computing subsystem 202 desires to access email attachment 412 of email 404, for example, the user may select link 512 within reference 502. Archiving module 106 may then restore attachment 412 by instructing computing subsystem 202 to download the archived instance of email 404 (which may include attachment 412) from archive database 120 of archiving system 206.

Stored-reclamation module 108 may create references to groups of related data elements in a variety of ways. In one example, storage-reclamation module 108 may: 1) amalgamate properties of at least two data elements within a group of data elements and then 2) include these amalgamated properties within a single reference or shortcut to this group of data elements. For example, storage-reclamation module 108 may, when creating reference 502 in FIG. 5 for emails 402-406: 1) identify each unique sender/recipient contained within each of emails 402-406 (in this example, "Robert C.," "Jason T.," and "Amber M.") and then 2) display each of these unique senders/recipients within reference 502.

In addition, in some examples an operation directed toward reference 502 in FIG. 5 may be applied to each of the data elements within the group of related data elements that are pointed to by this reference. For example, a user of computing subsystem 202 in FIG. 2 may request, by selecting or otherwise manipulating reference 502 in FIG. 5, the deletion of each of emails 402-406. Upon receiving this request, archiving module 106 may delete archived instances of emails 402-406 from archive database 120 of archiving system 206 in FIG. 2. Applying operations in this manner may enable users to perform operations at a group-granularity level, as opposed to an individual-item granularity level.

Similarly, if a user of computing subsystem 202 performs a search operation on his/her mailbox in FIG. 5, archiving module 106 may determine whether one or more of emails 402-406 satisfy the user's search query and, if so, return a single search result for the entire group of related emails (i.e., emails 402-406), as opposed to returning a search result for each email within emails 402-406 that satisfies the user's search query. Additional examples of operations that may be applied to groups of related data elements include, without limitation, search operations, file operations (e.g., read, write, delete, or move operations), retrieve operations (e.g., operations that request retrieval of archived groups of data elements from an archiving system), or the like.

In some examples, archiving module 106 may assign a unique identifier to the group of related data elements archived in step 308. For example, archiving module 106 may assign a unique identifier to the archived instances of emails 402-406. Archiving module 106 may then store this unique identifier with each archived instance of emails 402-406 within archive database 120 of archiving system 206 in FIG. 2. In some examples, this unique identifier may be used to identify groups of related data elements for deletion and/or retrieval purposes.

By identifying and determining whether each data element within a group of related data elements is eligible for archiving prior to archiving any of the data elements, the systems and methods described herein may prevent archiving systems from archiving one data element within a group of related data elements without archiving the other related data elements. This may prevent, for example, an archiving system from archiving only a portion of emails in a conversation thread. Moreover, by creating and providing a single reference or shortcut to an entire group of archived/related data elements, as opposed to creating a separate reference or shortcut for each archived data element, the systems and methods described herein may conserve storage space and improve storage management on endpoint devices.

Figure 6:
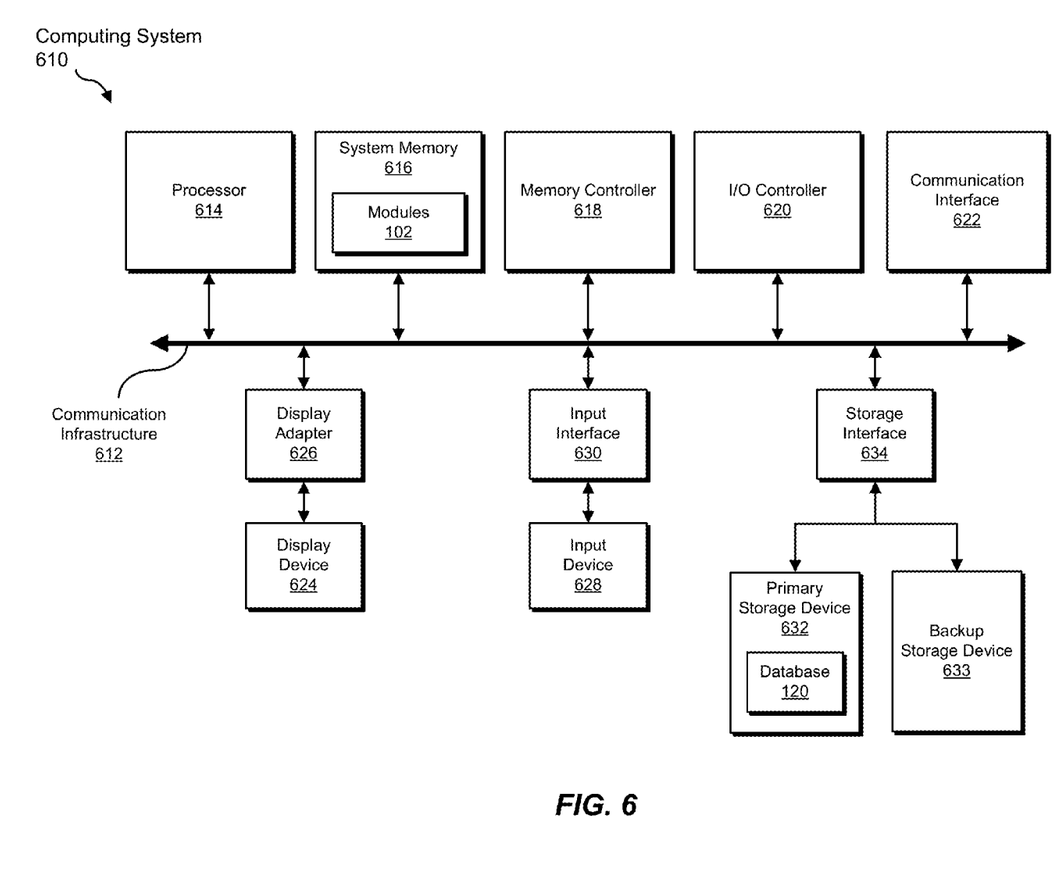
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, archiving, receiving, applying, assigning, removing, creating, amalgamating, including, and returning steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, determining, archiving, receiving, applying, assigning, removing, creating, amalgamating, including, and returning.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, determining, archiving, receiving, applying, assigning, removing, creating, amalgamating, including, and returning steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, archiving, receiving, applying, assigning, removing, creating, amalgamating, including, and returning steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, archiving, receiving, applying, assigning, removing, creating, amalgamating, including, and returning steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, determining, archiving, receiving, applying, assigning, removing, creating, amalgamating, including, and returning steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
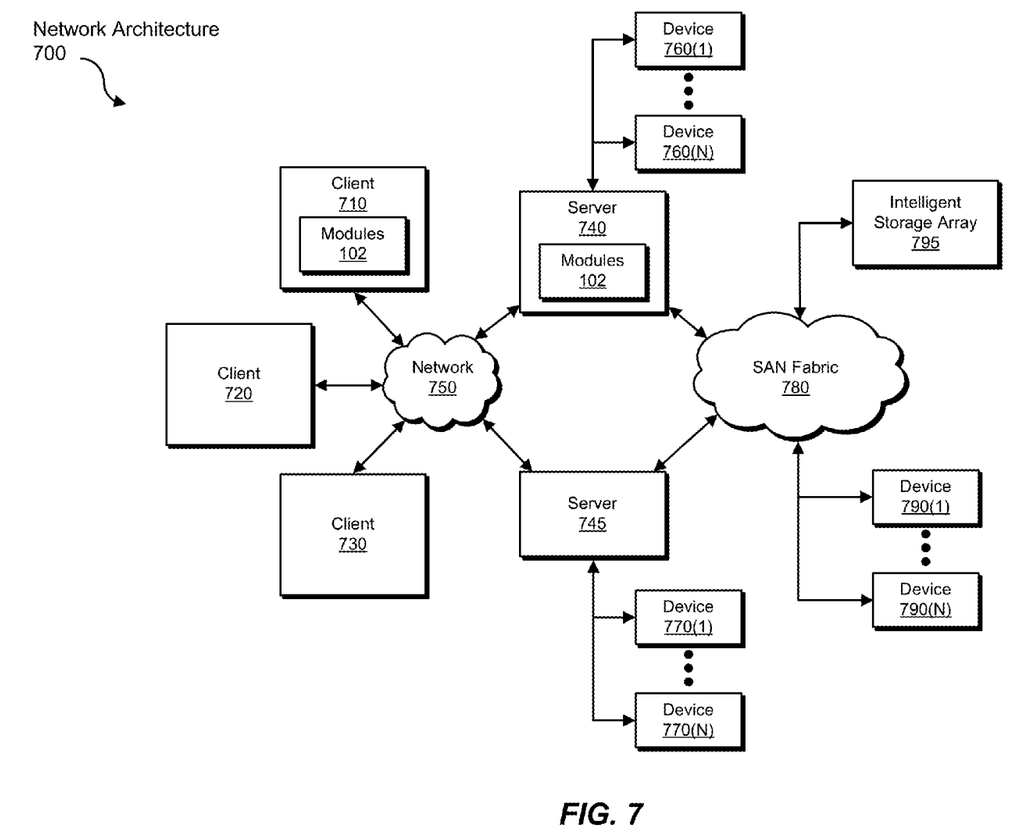
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 and/or server 740 may include modules 102 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, archiving, receiving, applying, assigning, removing, creating, amalgamating, including, and returning steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for archiving related items. In one example, this exemplary method may include: 1) identifying a data element on the computing device, 2) identifying at least one additional data element on the computing device that is related to the data element, the data element and the additional related data element collectively representing a group of related data elements, 3) determining, by applying an archiving policy to the group of related data elements, that the entire group of related data elements is eligible for archiving, and then 4) archiving the group of related data elements.

In some examples, identifying the data element may include receiving a request to archive the data element. In addition, identifying at least one additional data element that is related to the data element may include determining that the additional data element shares at least one property in common with the data element. This property may include a file name, a file size, a file-creation date, a file-modification date, a file author, file content, a file type, and/or a file property.

In one example, the data element may include an email, the additional data element may include a related email, and the property may include an email property. In this example, the email property may include an email recipient, an email sender, an email subject line, email content, an email file size, an email attachment, an email-attachment file size, an email send date, and/or an email receive date.

In some examples, applying the archiving policy to the group of related data elements may include determining whether each data element within the group of related data elements satisfies criteria relating to a file name, a file size, a file-creation date, a file-modification date, a file author, file content, a file type, and/or a file property. In addition, the method may also include assigning a unique identifier to the group of related data elements.

In one example, the method may also include removing the group of related data elements from the computing device. The method may also include creating a single reference on the computing device for the group of related data elements, with the reference pointing to the archived group of related data elements. In this example, creating the reference may include: 1) amalgamating properties of at least two data elements within the group of related data elements and then 2) including the amalgamated properties in the reference on the computing device.

The method may also include: 1) receiving a request, via the reference, to apply an operation to the group of related data elements and then 2) applying the operation to the archived group of related data elements. Examples of this operation may include a search operation, a delete operation, a retrieve operation, and/or a file operation.

In some examples, applying the search operation may include: 1) determining that a plurality of data elements within the group of related data elements satisfy a search query and then 2) returning a single search result for the entire group of related data elements, as opposed to returning a search result for each data element within the group of related data elements that satisfies the search query.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, archiving module 106 in FIG. 1 may transform a property or characteristic of archiving system 206 in FIG. 2 by creating and/or modifying archived instances 122 of data elements within archive database 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for archiving related items, at least a portion of the method being performed by a computing device comprising at least one processor, the method comprising:

identifying a data element on the computing device, wherein identifying the data element comprises identifying an email;

identifying at least one additional data element on the computing device that is related to the data element, the data element and the additional related data element collectively comprising a group of related data elements, wherein identifying the additional data element that is related to the data element comprises:

identifying a conversation thread of which the email is a part;

identifying at least one additional email from the same conversation thread of which the email is a part;

prior to archiving any of the data elements within the group of related data elements, determining, by applying an archiving policy to the group of related data elements, that each data element within the group of related data elements is eligible for archiving;

archiving the group of related data elements only upon determining that each data element within the group of related data elements is eligible for archiving.

2. The method of claim 1, wherein identifying the data element comprises receiving a request to archive the data element.

3. The method of claim 1, wherein identifying the additional data element that is related to the data element comprises determining that the additional data element shares at least one property in common with the data element.

4. The method of claim 3, wherein the property comprises at least one of:
a file name;
a file size;
a file-creation date;
a file-modification date;
a file author;
file content;
a file type.

5. The method of claim 3, wherein the property comprises at least one of:
an email recipient;
an email sender;
an email subject line;
email content;
an email file size;
an email attachment;
an email-attachment file size;
an email send date;
an email receive date.

6. The method of claim 1, wherein applying the archiving policy to the group of related data elements comprises determining whether each data element within the group of related data elements satisfies criteria relating to at least one of:
a file name;
a file size;
a file-creation date;
a file-modification date;
a file author;
file content;
a file type;
a file property.

7. The method of claim 1, further comprising assigning a unique identifier to the group of related data elements.

8. The method of claim 1, further comprising removing the group of related data elements from the computing device.

9. The method of claim 1, further comprising:
receiving a request, via a reference, to apply an operation to the group of related data elements;
applying the operation to the archived group of related data elements.

10. The method of claim 9, wherein the operation comprises at least one of:
a search operation;
a delete operation;
a retrieve operation;
a file operation.

11. The method of claim 10, wherein applying the search operation comprises:
determining that a plurality of data elements within the group of related data elements satisfy a search query;
returning a single search result for the entire group of related data elements, as opposed to returning a separate search result for each data element within the group of related data elements that satisfies the search query.

12. A system for archiving related items, the system comprising:
an identification module, stored in memory, that:
identifies a data element on a computing device, wherein identifying the data element comprises identifying an email;
identifies at least one additional data element on the computing device that is related to the data element, the data element and the additional related data element collectively comprising a group of related data elements, wherein identifying the additional data element that is related to the data element comprises:
identifying a conversation thread of which the email is a part;
identifying at least one additional email from the same conversation thread of which the email is a part;
an archiving module, stored in memory, that:
determines, prior to archiving any of the data elements within the group of related data elements, that the entire group of related data elements is eligible for archiving by applying an archiving policy to the group of related data elements;
archives the group of related data elements only upon determining that each data element within the group of related data elements is eligible for archiving;
at least one hardware processor configured to execute the identification module and the archiving module.

13. The system of claim 12, wherein the identification module identifies the additional data element that is related to the data element by determining that the additional data element shares at least one property in common with the data element.

14. The system of claim 12, wherein the archiving module applies the archiving policy to the group of related data elements by determining whether each data element within the group of related data elements satisfies criteria relating to at least one of:
a file name;
a file size;
a file-creation date;
a file-modification date;
a file author;
file content;
a file type;
a file property.

15. The system of claim 12, wherein the archiving module is further programmed to assign a unique identifier to the group of related data elements.

16. A non-transitory computer-readable medium comprising computer-executable instructions that, when executed by at least one processor of a computing device, cause the computing device to:
identify a data element on the computing device, wherein identifying the data element comprises identifying an email;
identify at least one additional data element on the computing device that is related to the data element, the data element and the additional related data element collectively comprising a group of related data elements, wherein identifying the additional data element that is related to the data element comprises:
identifying a conversation thread of which the email is a part;
identifying at least one additional email from the same conversation thread of which the email is a part;
determine, prior to archiving any of the data elements within the group of related data elements, that the entire group of related data elements is eligible for archiving by applying an archiving policy to the group of related data elements;
archive the group of related data elements only upon determining that each data element within the group of related data elements is eligible for archiving.

17. The non-transitory computer-readable medium of claim 16, wherein the computer-readable instructions cause the computing device to identify the data element by causing the computing device to receive a request to archive the data element.

18. The non-transitory computer-readable medium of claim 16, wherein the computer-executable instructions further cause the computing device to remove the group of related data elements from the computing device.

19. The non-transitory computer-readable medium of claim 16, wherein the computer-executable instructions further cause the computing device to:
    receive a request, via a reference, to apply an operation to the group of related data elements;
    apply the operation to the archived group of related data elements.

\* \* \* \* \*